United States Patent [19]

Okutani et al.

[11] Patent Number: 4,940,684

[45] Date of Patent: Jul. 10, 1990

[54] METHOD FOR PREPARING A CATALYST SUPPORTED ON SILICON CARBIDE OR SILICON NITRIDE

[75] Inventors: Takeshi Okutani; Yoshinori Nakata; Masaaki Suzuki, all of Sapporo; Takeo Akiyama, Ayase, all of Japan

[73] Assignee: President of Agency of Industrial Science and Technology, Tokyo, Japan

[21] Appl. No.: 250,136

[22] Filed: Sep. 27, 1988

[30] Foreign Application Priority Data

Sep. 28, 1987 [JP] Japan .................................. 62-242995

[51] Int. Cl.$^5$ ........................ B01J 27/22; B01J 27/24; B01J 32/00
[52] U.S. Cl. .................................... 502/178; 502/200; 502/439
[58] Field of Search ................................ 502/178, 200

[56] References Cited

U.S. PATENT DOCUMENTS 4,048,098 9/1977 Koberstein et al. ................ 502/178
4,274,981 6/1981 Suzuki et al. ...................... 502/178

Primary Examiner—W. J. Shine
Attorney, Agent, or Firm—Wenderoth, Lind & Ponack

[57] ABSTRACT

There are disclosed a catalyst which comprises a carrier composed of a porous silicon carbide or a porous silicon nitride prepared by a silicon-accumulated biomass and a catalytic substance supported thereon, and a method for preparing a catalyst which comprises supporting a catalytic substance on a porous silicon carbide or a porous silicon nitride prepared by subjecting a silicon-accumulated biomass to heat treatment under an argon or a nitrogen atmosphere.

3 Claims, No Drawings

4,940,684

METHOD FOR PREPARING A CATALYST SUPPORTED ON SILICON CARBIDE OR SILICON NITRIDE

BACKGROUND OF THE INVENTION

This invention relates to a catalyst and method for preparing the same, more particularly to a metal-supported catalyst for purifying the exhaust gas of an automobile and for combustion using a porous silicon carbide and/or a porous silicon nitride prepared by silicon-accumulated biomass such as rice hull and/or rice straw as a heat-resistant carrier and a method for preparing the same.

Since metals such as platinum, rhodium, palladium, etc. adsorb hydrogen and oxygen and the adsorbed hydrogen and oxygen have been activated, they have heretofore been utilized for the oxidation of ammonia, the preparation of hydrogen cyanide, the reforming of petroleum, etc. and as a reducing or oxidizing catalyst.

In recent years, accompanying the abrupt popularization of automobiles, air pollution due to their exhaust gas becomes remarkable so that purification of exhaust gas using a catalyst has been carried out by removing unburned hydrocarbon (HC), carbon monoxide (CO), nitrogen oxide ($NO_x$), etc. which are harmful substances in the exhaust gas of automobiles. As a catalyst for purifying the exhaust gas of automobiles, platinum group catalysts including platinum have mainly been used.

In respect to the reactions involved in purifying exhaust gas, the basic reactions are that HC and CO are converted to $H_2O$ and $CO_2$ by oxidation, respectively, and $NO_x$ is converted to $N_2$ by reduction to make them harmless. Accordingly, it is required to use a oxidation-reduction binary catalyst. At present, an engine exhaust gas is balanced to the extent that either one of HC, CO and $NO_x$ can be purified in a theoretical air-fuel ratio, so that purification of the above three components has mainly been carried out by a ternary purification catalyst.

Rhodium (Rh) having high reductivity to $NO_x$ and platinum (Pt) or palladium (Pd) having high oxidation activity to HC and CO are used in combination as the ternary purification catalyst, and further oxides of nickel (Ni), iron (Fe), cobalt (Co), manganese (Mn), cerium (Ce) and zirconium (Zr) are used, but the main components thereof are platinum group catalysts such as Rh, Pt and the like.

These platinum group catalysts are practically used as pellets or in monolith form. The catalyst substances such as platinum are supported on the pellet compound of a piller or spherical shaped active alumina or on coating layer comprising an alumina stuck on the surface of the monolith compound of cordierite ($2Al_2O_3$.$5SiO_2$.$2MgO$) having a number of penetrated gas passages. However, since the pellet catalyst has a large heat capacity, it is inferior in heat properties. That is, when using a catalyst, it is required to heat a catalyst reactor to a predetermined temperature. But when the heat capacity of the catalyst is large, it takes a long time for heating the reactor so that it has a disadvantage that it does not work normally as a catalyst.

On the other hand, in the monolith catalyst, the melting point of the carrier is low so that it has problems in heat resistance, etc. Also, in the carrier comprising alumina which is used in both pellet or monolith catalysts, it has a problem with respect to the heat resistance under high temperature when used as a catalyst for a large scale engine of a large truck, etc. As described above, there are problems in that each of the conventional catalysts do not satisfy the requirements for functioning satisfactory as a catalyst.

Also, in combustion equipment such as boilers, in addition to CO, $NO_x$, i.e., thermal $NO_x$ is generated by the reaction of nitrogen and oxygen in air at a temperature of 1500° C. or higher whereby pollution is brought about. Thus, by using the above mentioned noble metal supported catalysts as combustion catalysts and utilizing their oxidizing properties and reductivities, research on catalytic combustion has been carried out to conduct perfect combustion at a low temperature which does not generate any thermal $NO_x$ or CO. This catalytic combustion is principally the same in the case of purification of exhaust gas from automobiles. In this catalytic combustion, it is desirable to conduct the combustion at such a high temperature as to not generate thermal $NO_x$ (1000° to 1500° C.) in order to increase the thermal recovery efficiency.

Accordingly, as a combustion catalyst, it has problems concerning the heat resistance thereof at high temperatures as in the temperatures used to purify exhaust gas from automobiles.

SUMMARY OF THE INVENTION

An object of the present invention is to provide a catalyst for the purification of the exhaust gas of automobiles and for combustion, which catalyst is small in heat capacity and excellent in heat resistance, as well as a method for preparing the same.

The present inventors have conducted intensive studies and as a result, they have found that by using a carrier comprising a porous silicon carbide or a porous silicon nitride which is prepared by silicon-accumulated biomass, the above object has been accomplished, whereby the present invention has been completed.

That is, the catalyst of the present invention comprises a carrier consisting essentially of a porous silicon carbide or a porous silicon nitride prepared by a silicon-accumulated biomass and a catalyst active substance carried thereon. A method for preparing the same comprises a catalyst active substance carried on a porous silicon carbide or a porous silicon nitride prepared by subjecting a silicon-accumulated biomass to heat treatment in an argon or nitrogen gas atmosphere.

DESCRIPTION OF THE PREFERRED EMBODIMENTS

The silicon-accumulated biomass to be used in the present invention means a plant containing a silica component (silicon-accumulated plant), or a part thereof such as a leaf, a stem, etc., more specifically, there may be mentioned rice hull, wheat chaff, the straw of a rice, wheat, etc., a bamboo leaf, a leaf or straw of corn, sugar cane or scouring rush, and the like.

The catalyst of the present invention uses a porous silicon carbide or a porous silicon nitride prepared by subjecting the silicon-accumulated biomass to heat treatment as a carrier.

The method for preparing the porous silicon carbide in accordance with the present invention comprises firstly subjecting, for example, rice hull itself or rice hull powder obtained by pulverizing rice hull, as the silicon-accumulated biomass, to heat treatment in an argon or nitrogen gas atmosphere at temperature in the range of 300° to 1200° C., preferably 600° to 1000° C. to prepare coked rice hull. In this step, since it is an object to prepare the coaked rice hull, either an agon or nitrogen atmosphere may be used. In case of using powder silicon-accumulated biomass, the particle size of the powder may be 152 μm or less (hereinafter referred to as "Type A"), 152 to 295 μm (hereinafter referred to as "Type B") or 295 to 1000 μm (hereinafter referred to as "Type C"), or mixtures thereof. The coked rice hull obtained is amorphous and it is considered to be a mixture of amorphous silica and carbon. The composition of the coked rice hull comprises, after the above heat treatment at the above all temperature range, about 40% by weight of $SiO_2$ and about 60% by weight of C. Next, by further subjecting the coked rice full to heat treatment in an argon gas atmosphere as in the above at a temperature range of 1300° C. to 2000° C., preferably 1400° to 1600° C., a mixture of silicon carbide (SiC) and carbon (C) can be obtained. The time of the heat treatment is different depending upon kinds of the silicon-accumulated biomass to be used. Optimum conditions for forming an amorphous SiC which is preferred as a catalyst may optionally be selected and the time of the heat treatment is, for example, from 0.1 to 12 hours. This amorphous SiC is to be crystallized by subjecting to high temperature or a long time heat treatment to form β-SiC. The reason why the heat treatments of the silicon-accumulated biomass is carried out in two steps is to suitably remove tar components which are generated by the treatment of the silicon-accumulated biomass at low temperatures. It is required to use a pulverizing step on the coked rich hull after the first step of the heat treatment since in order to prepare amorphous SiC, it can be treated at lower temperatures and a shorter time, when the particle size of the coked rice hull are as fine as possible. In the present invention, silicon carbide having a surface area of 30 to 150 m²/g can be obtained from the aforesaid Type A, that having a surface area of 20 to 100 m²/g from the aforesaid Type B and that having a surface area of 15 to 50 m²/g from the aforesaid Type C, respectively.

In order to prepare SiC from rice hull, etc., it is possible to obtain SiC from these materials by heating them in one step at 1300° to 2000° C., preferably at 1400° to 1600° C. in an argon gas atmosphere. Since the SiC obtained is a mixture of SiC and C, the mixture is then treated at temperature of 400° to 800° C., preferably 500° to 650° C. to burn out C and obtain SiC.

The porous silicon nitride of the present invention can be obtained in the same manner as in the above porous silicon carbide except for replacing the treatment in an argon gas atmosphere with that in a nitrogen gas atmosphere, and by sintering in nitrogen, an amorphous silicon nitride ($Si_3N_4$) can be obtained. Then, the amorphous $Si_3N_4$ crystallizes to form α-$Si_3N_4$ by heating at a high temperature or a long time.

The porous silicon carbide or silicon nitride thus-produced has preferably a surface area of 15 to 150 m²/g.

The powder thus obtained is molded into pellet, and then a catalyst using the porous silicon carbide or porous silicon nitride of the present invention as a carrier can be prepared by a dipping method in which the pellet is dipped in a solution of a catalytic substance for a predetermined time to support the catalytic substance on a carrier, or an impregnating method is employed in which an amount corresponding to the pore volume of the carrier of a solution of catalytic substance is impregnated in a carrier.

In case of preparing it as a monolith catalyst, a porous silicon carbide or a porous silicon nitride is used in place of cordierite and is shaped into mold of a monolith catalyst, and then it is sintered at a suitable temperature. The sintered body obtained has a density which is lower than the theoretical density and is 20 to 70% thereof. Accordingly, on a surface of the sintered body, a catalytic substance is supported by dipping or impregnating in the same manner as the pellet catalyst described above to prepare the monolith catalyst.

According to the present invention, a catalyst which is excellent in heat resistance and small in heat capacity as compared with the conventional pellet or monolith catalyst which uses alumina or cordierite, and is effective for purification of exhaust gas of automobiles and for combustion, and can be relatively easily prepared from a silicon-accumulated biomass such as rice hull, etc.

EXAMPLES

Example 1

Rice hull having a content of moisture of 7 to 9% was compressed at a temperature of 200° to 300° C., under a pressure of 50 to 150 ton. Then, this compressed rice hull was crushed into three particle sizes, one of which had a particle size of 152 μm or less (Type A), that of 152 to 295 μm (Type B) and that of 295 to 1000 μm (Type C) by using a pulverizer.

Then, the respective rice hull powder having the particle size ranges was subjected to heat treatment at 700° C. for 3 hours in an argon gas atmosphere to prepare coked rice hull, respectively. The coked rice hull materials obtained were all amorphous and were mixtures of amorphous silica and carbon, respectively.

Next, in an argon gas atmosphere as in the above, the coked rice hull materials of the types described previously were each subjected to heat treatment at 1400° C. for 4 hours to obtain mixtures of silicon carbide and carbon, respectively.

The above mixtures of silicon carbide and carbon were further subjected to heat treatment at a temperature of 500° C. for 3 hours in air to burn off the carbon to obtain silicon carbides. The surface areas of the silicon carbides obtained were measured with respect to the individual particle sizes of the rice hulls. The results are shown in Table 1 below.

TABLE 1

| Type of rice hull | Surface area of silicon carbide obtained |
|---|---|
| Type A | 35 m²/g |
| Type B | 25 m²/g |
| Type C | 18 m²/g |

The silicon carbide obtained was molded in the same manner as in the conventional method to form a pellet catalyst or a monolith catalyst and the molded material was sintered to obtain a sintered body.

In order to support a platinum and/or rhodium group metal on the thus obtained silicon carbide carrier, the following method can be used.

That is, in 2 liters of a mixed solution of platinic chloride ($H_2PtCl_6.6H_2O$) and rhodium chloride ($RhCl_3.3H_2O$) containing a total metal amount of 1.0 g composed of, in terms of metal weight ratio, 80% of platinum and 20% of rhodium, the carrier was dipped and then sintered in a dried air at 600° C. for 1.5 hours to obtain the catalyst of the present invention.

Example 2

In the same manner as in Example 1, a silicon carbide carrier was obtained. In order to support a catalytic substance onto a surface of a silicon carbide carrier obtained, an alumina coating layer was prepared in the manner as mentioned below. That is, after the above carrier was dipped in a slurry containing an alumina which is converted to an active alumina ($\gamma$-alumina) by sintering at an adequate temperature, it was taken out to remove the excess slurry, dried and then sintered at 400° to 800° C. to form an alumina coating layer.

Then, the silicon carbide carrier having an alumina coating layer was dipped in 2 liters of a mixed solution of platinic chloride ($H_2PtCl_6.6H_2O$) and rhodium chloride ($RhCl_3.3H_2$) containing a total metal amount of 1.0 g composed of, in terms of metal weight ratio, 80% of platinum and 20% of rhodium, and then sintered in a dried air at 600° C. for 1.5 hours to obtain the catalyst of the present invention.

Example 3

In the same manner as in Example 1, coked rice hull materials were obtained by subjecting the respective rice hull powders to heat treatment in an argon gas atmosphere at a temperature of 700° C. for 3 hours.

Next, they were subjected to heat treatment in a nitrogen atmosphere at a temperature of 1400° C. for one hour to obtain mixtures of silicon nitride and carbon, respectively.

They were each further subjected to heat treatment at a temperature of 500° C. for 3 hours in an air to burn off the carbon to obtain silicon nitrides. The surface area of the silicon nitrides obtained were measured with respect to the individual particle sizes of the rice hulls and the results are shown in Table 2 below.

TABLE 2

| Type of rice hull | Particle size of rice hull | Surface area of silicon nitride obtained |
|---|---|---|
| Type A | 152 μm or less | 50 m²/g |
| Type B | 295 to 152 μm | 32 m²/g |
| Type C | 1000 to 295 μm | 23 m²/g |

From the silicon nitride powders obtained, pellet catalysts and monolith catalysts were molded and processed in the same manner as in Example 1 to obtain catalytic substance-supported catalysts.

Example 4

On the silicon carbide prepared from the rice hull powder Type A (particle size: 152 μm or less) of Example 1 was supported 1% by weight of platinum and a reduction reaction rate of NO, the selectivity and conversion rate were measured by using this catalyst.

The method of preparing the catalyst is by weighing 0.5 g of silicon carbide powder and adding thereto 20 ml of a platinum chloride solution containing 5 mg of platinum and after allowing it to stand at room temperature for 12 hours, the liquid was essentially removed by a rotary evaporator to obtain silicon carbide supporting 1% by weight of platinum. Next, this silicon carbide powder was heated in air at a temperature of 600° C. for 1.5 hours to prepare a catalyst.

By using the catalyst prepared, the decomposition reaction of NO was measured. The measurement was carried out by setting 50 mg of the catalyst in a quartz reaction tube having a diameter of 5 mm, and passing a mixed gas of NO (4% by volume), $H_2$ (4% by volume) and He (92% by volume) at a flow rate of 50 cm² per minute and bringing the catalyst into contact with the mixed gas at a temperature of 43° to 156° C. The amounts of $N_2$ and $N_2O$, which are reaction products, were determined.

From the results of the measurement, the formation rates of $N_2$ and $N_2O$, and the selectivity thereof, that is, the ratio of $N_2$ in $N_2+N_2O$ [$N_2O/(N_2+N_2O)\times 100$ (%)] and the conversion rate of NO were measured.

The results were shown in Table 3 below.

TABLE 3

| Reaction temperature (°C.) | Reaction rate per unit weight of platinum (μmole/g-Pt.sec) | | Reaction rate per unit surface area (nmole/m².sec) | | Selectivity $N_2/(N_2+N_2O)\times 100$ (%) | Conversion rate (%) |
|---|---|---|---|---|---|---|
| | $N_2$ | $N_2O$ | $N_2$ | $N_2O$ | | |
| 43 | 2.96 | 0.772 | 1.02 | 0.265 | 79.3 | 0.21 |
| 78 | 4.5 | 5.21 | 1.55 | 1.79 | 46.3 | 0.59 |
| 102 | 12.8 | 32.6 | 4.40 | 11.2 | 28.2 | 2.73 |
| 130 | 55.9 | 175 | 19.2 | 60.1 | 24.2 | 13.9 |
| 156 | 375 | 740 | 129 | 254 | 33.6 | 67.2 |

In a conventional catalyst supported platinum of 0.78% on $\gamma$-alumina, the conversion rate of NO (or formation rate of $N_2+N_2O$) was 0.15 nmole/m².sec and a selectivity was 7.9% at 50° C., and in a catalyst supported platinum of 1.64% on $\gamma$-alumina, the conversion rate of NO was 0.51 nmole/m².sec and a selectivity was 8.9% at 50° C.

To the contrary, the platinum-supported silicon carbide catalyst of the present invention has an extremely high reaction rate per unit surface area and selectivity, thus it can be said that a catalyst having high characteristics can be obtained.

We claim:

1. A method for preparing a catalyst which comprises supporting a catalytic substance on a porous silicon carbide or a porous silicon nitride prepared by subjecting a silicon-accumulated biomass to heat treatment at 300° to 1200° C. under an argon or a nitrogen atmosphere, then at 1300° to 2000° C. for 0.1 to 12 hours in an argon or a nitrogen atmosphere and then at 400° to 800° C. in air.

2. A method for preparing a catalyst according to claim 1, wherein the silicon-accumulated biomass is a plant containing a silica component.

3. A method for preparing a catalyst according to claim 1, wherein the silicon-accumulated biomass is a member selected from the group consisting of rice hull, wheat chaff, the straw-like portion of rice, the straw-like portion of wheat, a bamboo leaf, the leaf portion of corn, the straw-like portion of corn, sugar cane and scouring rush.

* * * * *

UNITED STATES PATENT AND TRADEMARK OFFICE
CERTIFICATE OF CORRECTION

PATENT NO. : 4,940,684

DATED : July 10, 1990

INVENTOR(S) : Takeshi OKUTANI et al.

It is certified that error appears in the above-identified patent and that said Letters Patent is hereby corrected as shown below:

Column 6, line 22, change "$[N_2O/(N_2+N_2O)]$" to -- $[N_2/(N_2+N_2O)]$ --.

Signed and Sealed this

Fourteenth Day of July, 1992

Attest:

DOUGLAS B. COMER

*Attesting Officer*    *Acting Commissioner of Patents and Trademarks*